(12) United States Patent
Huang et al.

(10) Patent No.: US 8,553,129 B2
(45) Date of Patent: Oct. 8, 2013

(54) HANDHELD ELECTRONIC DEVICE WITH TWO LENS MODULES, DUAL IMAGE CAPTURING METHOD APPLYING FOR THE HANDHELD ELECTRONIC DEVICE, AND COMPUTER PROGRAM PRODUCT FOR LOAD INTO THE HANDHELD ELECTRONIC DEVICE

(75) Inventors: Chun-Hsiang Huang, Taoyuan (TW); Wen-Chi Chang, Taoyuan (TW)

(73) Assignee: HTC Corporation, Yaoyuan, Taoyuan County (TW)

( * ) Notice: Subject to any disclaimer, the term of this patent is extended or adjusted under 35 U.S.C. 154(b) by 248 days.

(21) Appl. No.: 13/104,160

(22) Filed: May 10, 2011

(65) Prior Publication Data

US 2012/0287315 A1    Nov. 15, 2012

(51) Int. Cl.
*H04N 5/222* (2006.01)
*G09G 5/00* (2006.01)

(52) U.S. Cl.
USPC .................. 348/333.05; 348/333.11; 345/659

(58) Field of Classification Search
USPC .................... 348/211.11, 218.1, 262, 333.01, 348/333.05, 333.11, 333.12; 345/659
See application file for complete search history.

(56) References Cited

U.S. PATENT DOCUMENTS

| | | | | |
|---|---|---|---|---|
| 7,561,191 B2 * | 7/2009 | May et al. | ................... | 348/240.2 |
| 7,619,683 B2 * | 11/2009 | Davis | ............................ | 348/374 |
| 7,724,296 B2 * | 5/2010 | Lonn | ........................ | 348/333.12 |
| 8,189,100 B2 * | 5/2012 | Li et al. | .......................... | 348/376 |
| 2002/0167593 A1 * | 11/2002 | Nakayama et al. | ...... | 348/207.99 |
| 2006/0275025 A1 * | 12/2006 | Labaziewicz et al. | .......... | 396/72 |
| 2007/0077056 A1 * | 4/2007 | Uchiumi et al. | .............. | 396/325 |
| 2007/0285550 A1 | 12/2007 | Son | | |
| 2008/0117316 A1 * | 5/2008 | Orimoto | ..................... | 348/240.3 |
| 2008/0218613 A1 * | 9/2008 | Janson et al. | ................. | 348/262 |
| 2008/0239131 A1 * | 10/2008 | Thorn | ....................... | 348/333.01 |
| 2010/0238327 A1 | 9/2010 | Griffith et al. | | |
| 2011/0043669 A1 * | 2/2011 | Ishida | ........................... | 348/264 |
| 2011/0045812 A1 | 2/2011 | Kim et al. | | |
| 2011/0242369 A1 * | 10/2011 | Misawa et al. | ............. | 348/240.2 |

FOREIGN PATENT DOCUMENTS

| | | |
|---|---|---|
| EP | 1560421 | 8/2005 |
| EP | 1566974 | 8/2005 |
| EP | 1763243 | 3/2007 |
| JP | 2004350047 A * | 12/2004 |

(Continued)

OTHER PUBLICATIONS

English translation of abstract of JP 2008-129439.

(Continued)

*Primary Examiner* — John Villecco
(74) *Attorney, Agent, or Firm* — McClure, Qualey & Rodack, LLP

(57) ABSTRACT

A handheld electronic device includes a first lens module, a second lens module, an input unit and a control unit. The first lens module and the second lens module are respectively disposed on the handheld electronic device. The first lens module captures scenes in a first image capturing boundary. The second lens module captures scenes in a second image capturing boundary, which is different from the first image capturing boundary. The input unit is used for receiving a user input for capturing images. When the input unit receives the user input, the control unit controls the first lens module and the second lens module to captures a first image and a second image respectively at the same time.

11 Claims, 6 Drawing Sheets

(56) References Cited

FOREIGN PATENT DOCUMENTS

| | | |
|---|---|---|
| JP | 2008-129439 | 6/2008 |
| JP | 2010-177730 | 8/2010 |
| JP | 2011-048283 | 3/2011 |
| WO | 01/31893 | 5/2001 |

OTHER PUBLICATIONS

English translation of abstract of JP 2011-048283.
English translation of abstract of JP 2010-177730.
Extended European Search Report for EP 11165407 mailed Aug. 17, 2011.

* cited by examiner

HANDHELD ELECTRONIC DEVICE WITH TWO LENS MODULES, DUAL IMAGE CAPTURING METHOD APPLYING FOR THE HANDHELD ELECTRONIC DEVICE, AND COMPUTER PROGRAM PRODUCT FOR LOAD INTO THE HANDHELD ELECTRONIC DEVICE

BACKGROUND

1. Technical Field

The present invention relates to an electrical device, an image capturing method and a computer program product for loading into thereof. More particularly, the present invention relates to a handheld electrical device, a dual image capturing method and a computer program product for loading into thereof.

2. Description of Related Art

As 3C (Computer, Communications and Consumer) technology develops, there are more and more people utilizing handheld electrical devices in their daily life. Most common handheld electrical devices are personal digital assistants (PDA), mobile phones, smart phones etc. Since mobile electrical devices are designed much smaller and easy to carry, more and more people use handheld electrical device and more functions are developed for different users.

Nowadays, most handheld electrical devices are equipped with cameras. Wherein, images captured and output by such cameras are landscape images (or called landscape images). If users want images output vertically (as portrait images), the images must be reduced or cut since the width/length ratio of the portrait image and that of the landscape image are different. However, users may not be satisfied with the portrait images after reduce or cut. In particular, when the images captured are video, distortion of the portrait images (videos) thereof may be more obviously since the image may be further trans-coded, which may disturbs users.

SUMMARY

According to one embodiment of this invention, a handheld electrical device is provided. When a user wants to utilize the handheld electrical device to capture images, the handheld electrical device controls different lens modules, image capturing boundaries of which are different, to capture images with the different image capturing boundaries at the same time. The handheld electrical device includes a first lens module with a first image capturing boundary, a second lens module with a second image capturing boundary, an input unit and a control unit. The first lens module and the second lens module are disposed on the handheld electrical device respectively. Wherein, the first image capturing boundary and the second image capturing boundary are different. The input unit is configured to receive a user input for capturing images. When the input unit receives the user input, the control unit controls the first lens module and the second lens module to respectively capture a first image and a second image at the same time.

According to another embodiment of this invention, a dual image capturing method is provided. In the dual image capturing method, when a user wants to utilize a handheld electrical device to capture images, the handheld electrical device controls different lens modules, image capturing boundaries of which are different, to capture images with the different image capturing boundaries at the same time. The dual image capturing method is suitable for a handheld electrical device. The handheld electrical device includes a first lens module with a first image capturing boundary and a second lens module with a second image capturing boundary. Wherein, the first image capturing boundary and the second image capturing boundary are different. The dual image capturing method can be implemented as a computer program product, which includes at least one program instruction. The at least one program instruction of the computer program product is used for being loaded into the handheld electrical device. After the at least one program instruction of the computer program product is loaded into the handheld electrical device, the handheld electrical device executes the steps of the dual image capturing method. The dual image capturing method includes the following steps: a user input for capturing images is received. When the user input is received, a first image and a second image are captured at the same time by the first lens module and the second lens module respectively.

Above all, the handheld electrical device can capture images in different image capturing boundaries at the same time without moving the handheld electrical device. Hence, when capturing images occurring in a flash, images in different image capturing boundaries can be captured to avoid missing any of the boundaries. Besides, if the images captured by the handheld electrical device are videos, the user can switch between portrait images and landscape images without too much image distortion.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
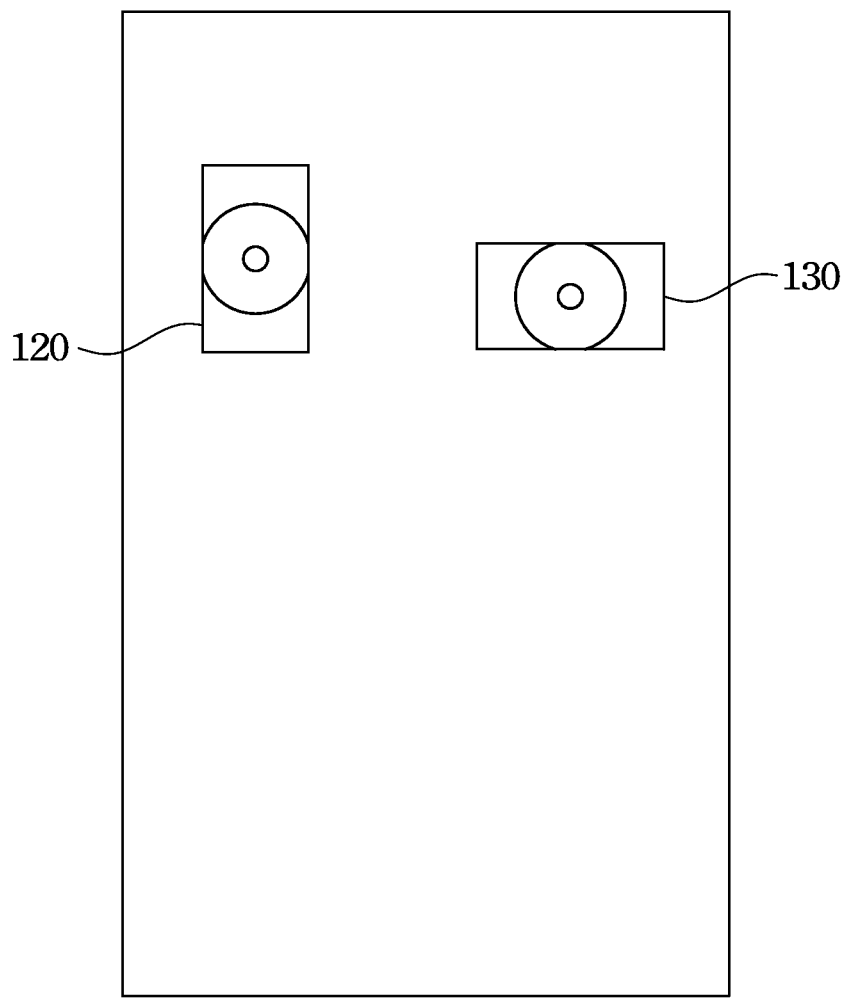
FIG. 1 is a rear-view diagram of a handheld electrical device according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
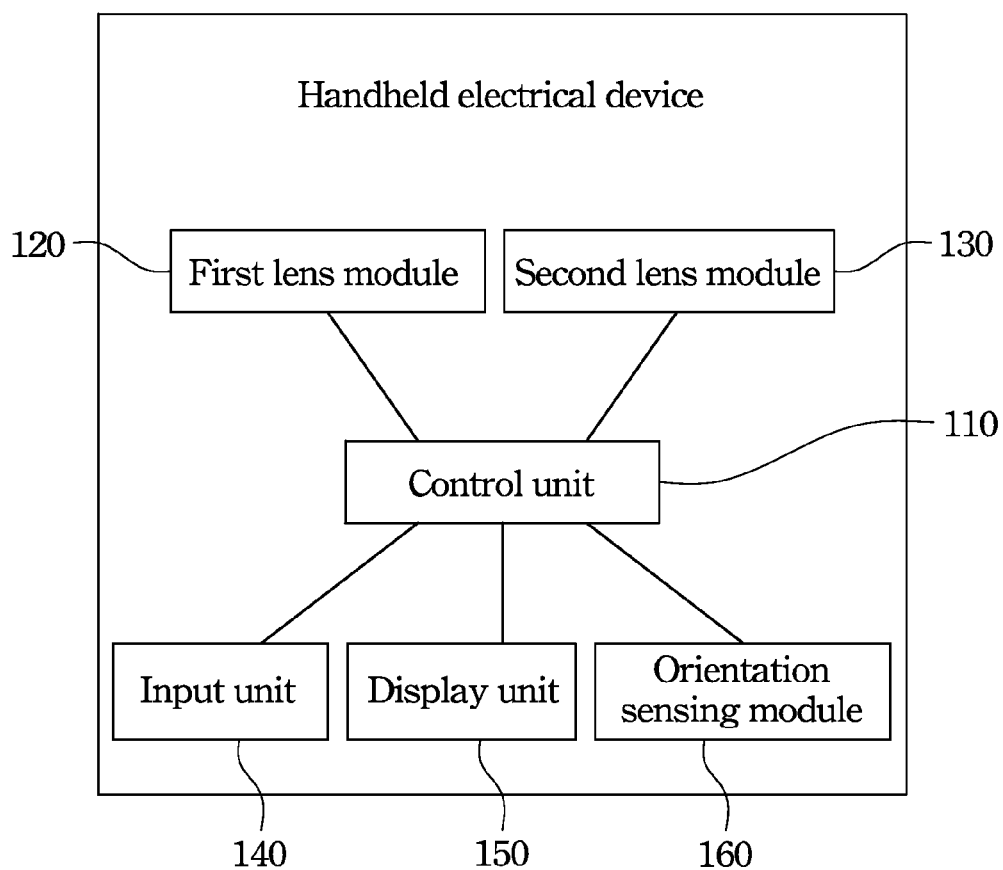
FIG. 2 is a block diagram of the handheld electrical device in FIG. 1.

FIG. 1 is a rear-view diagram of a handheld electrical device according to one embodiment of this invention. FIG. 2 is a block diagram of the handheld electrical device in FIG. 1.

When a user wants to utilize the handheld electrical device to capture images, the handheld electrical device controls different lens modules, image capturing boundaries of which are different, to capture images with the different image capturing boundaries at the same time. The handheld electrical device 100 includes a control unit 110, a first lens module 120, a second lens module 130, and an input unit 140. The first lens module 120 and the second lens module 130 are disposed on the handheld electrical device 100 respectively. The first lens module 120, the second lens module 130, and the input unit 140 are electrically connected to the control unit 110. The input unit 140 may be at least one button, a keyboard, a graphical user interface (GUI) or other types of input units.

The first lens module 120 can capture scenes with a first image capturing boundary. The second lens module 130 can capture scenes with a second image capturing boundary. Wherein, the first image capturing boundary and the second image capturing boundary are different. The input unit 140 is configured to receive a user input for capturing images. When the input unit 140 receives the user input, the control unit 110 controls the first lens module 120 and the second lens module 130 to respectively capture a first image and a second image at the same time. Wherein, the first image and the second image may include pictures, videos or other types of image. Therefore, the handheld electrical device 100 can capture images in different image capturing boundaries at the same time without moving the handheld electrical device 100. Hence, when capturing images occurring in a flash, images in different image capturing boundaries can be captured to avoid missing any of the boundaries.

In one embodiment of this invention, the first image captured by the first lens module 120 is a portrait image (captured in a portrait mode), and the second image captured by the second lens module 130 is a landscape image (captured in a landscape mode). Hence, the disposed orientation of the first lens module 120 is substantially vertical to that of the second lens module 130. Therefore, the first image (portrait image) captured by the first lens module 120 may be substantially vertical to the second image (landscape image) captured by the second lens module 130. In other words, a portrait image and a landscape image can be captured at the same time without moving the handheld electrical device 100. In addition, when the user selects a video mode of a traditional handheld electrical device, the user can only take a landscape video. If the user wants to view the landscape video on a portrait screen, the user has to wait a long time for image trans-coding. In other words, during the trans-coding, the original coded landscape video must be decoded before encoding to a portrait video. Since the image trans-coding takes a long time, the user can't view the landscape images immediately. Besides, since the landscape images are coded twice, the landscape images may be distorted, which may lead to worse image quality. If the present invention is applied, the user can switch between portrait images and landscape images without too much image distortion.

Besides, the handheld electrical device 100 can display image captured by different lens modules with different image capturing boundaries corresponding to the orientation (such as portrait orientation or landscape orientation) of the handheld electrical device 100. Hence, the handheld electrical device 100 may further include a display unit 150 and an orientation sensing module 160. The orientation sensing module 160 is configured to sense an orientation of the handheld electrical device. Wherein, the orientation sensing module 160 may be a g sensor or any other element which can sense the orientation of the handheld electrical device 100. Hence, when the handheld electrical device 100 is in a photograph mode, the handheld electrical device 100 can control the display unit 150 to display images captured by different lens modules with different image capturing boundaries corresponding to the orientation of the handheld electrical device 100. Wherein, when the orientation sensing module 160 senses that the handheld electrical device 100 is in a first orientation, the control unit 110 controls the display unit 150 to display a scene captured by the first lens module 120 with the first image capturing boundary; when the orientation sensing module 160 senses that the handheld electrical device 100 is in a second orientation, the control unit 110 controls the display unit 150 to display another scene captured by the second lens module 130 with the second image capturing boundary. Wherein, the first orientation and the second orientation are different. Hence, when the handheld electrical device 100 is in the photograph mode, the handheld electrical device 100 can control its display unit 150 to display scenes captured by different lens modules with different image capturing boundaries in real time corresponding to the orientation of the handheld electrical device 100. In other words, when the handheld electrical device 100 is in the photograph mode, the user can change the orientation of the handheld electrical device 100 to control the handheld electrical device 100 to display scenes captured with different image capturing boundaries.

Figure 3:
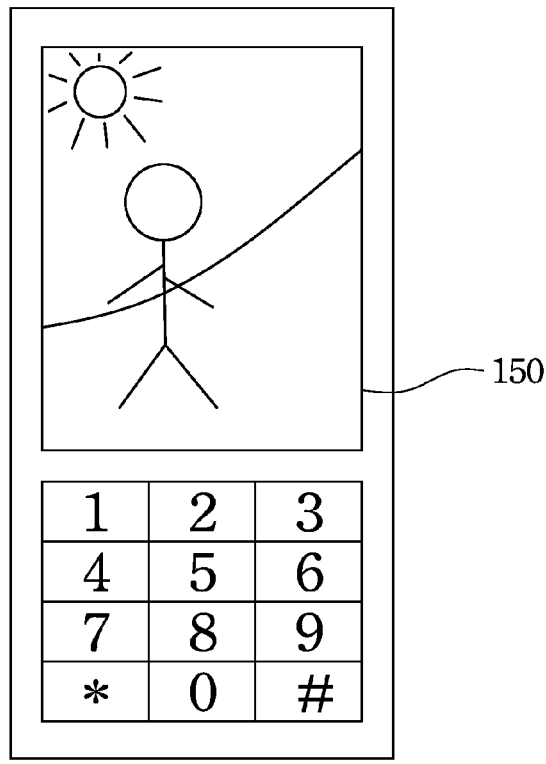
FIG. 3 illustrates a front-view diagram of the handheld electrical device in FIG. 1 in a portrait orientation.
Figure 4:
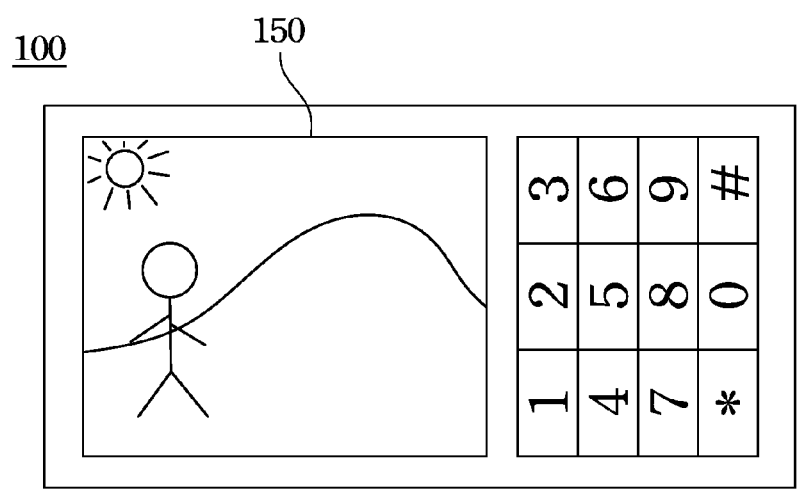
FIG. 4 illustrates a front-view diagram of the handheld electrical device in FIG. 1 in a landscape orientation.

FIG. 3 illustrates a front-view diagram of the handheld electrical device in FIG. 1 in a portrait orientation. FIG. 4 illustrates a front-view diagram of the handheld electrical device in FIG. 1 in a landscape orientation. In one embodiment of this invention, the first orientation of the handheld electrical device 100 may be a portrait orientation, and the second orientation of the handheld electrical device 100 may be a landscape orientation. Hence, when the orientation sensing module 160 senses that the handheld electrical device 100 is in the portrait orientation, the control unit 110 controls the display unit 150 to display the portrait image captured by the first lens module 120 with the first image capturing boundary (as shown in FIG. 3). When the orientation sensing module 160 senses that the handheld electrical device 100 is in the landscape orientation, the control unit 110 controls the display unit 150 to display the landscape image captured by the second lens module 130 with the second image capturing boundary (as shown in FIG. 4). In other embodiments, the first orientation and the second orientation are not limited to the portrait orientation and the landscape orientation in this disclosure. Therefore, when the handheld electrical device 100 is in the photograph mode, the user can put the handheld electrical device 100 in the portrait or landscape orientation to display the portrait or landscape image correspondingly for user's convenience. Besides, the portrait image being displayed horizontally or the landscape image being displayed vertically on the display unit 150, which may waste the display area of the display unit 150, can be avoided.

When the handheld electrical device 100 displays images captured by one of the lens modules, at least one indication line to indicate the boundary of the other lens module can be displayed on the displayed images. Hence, when the handheld electrical device 100 is in the photograph mode and the orientation sensing module 160 senses that the handheld electrical device 100 is in the first orientation, the control unit 110 controls the display unit 150 to display a scene captured by the first lens module 120 with the first image capturing boundary, and to further display one or more first indication lines on the displayed scenes. Wherein the one or more first indication lines indicate the position that the second image capturing boundary captured by the second lens module 130 corresponds to the first image capturing boundary. In one embodiment of this invention, the first indication line may be a fixed position on the displayed first image capturing boundary. In another embodiment of this invention, the position of the first indication line can be obtained by comparing the scenes captured with the first image capturing boundary with that with the second image capturing boundary. However, the corresponding position of the first indication line can be obtained utilizing other methods, which should not be limited in this disclosure.

Besides, when the handheld electrical device 100 is in the photograph mode and the orientation sensing module 160 senses that the orientation of the handheld electrical device 100 is in the second orientation, the control unit 110 controls the display unit 150 to display a scene captured by the second lens module 130 with the second image capturing boundary, and to further display one or more second indication lines on the displayed scenes to indicate the first image capturing boundary captured by the first lens module 120. Therefore, when the handheld electrical device 100 displays images captured by one of the lens modules, at least one indication line to indicate the boundary of the other lens module can be displayed on the displayed images, which can help users understand the boundary captured by the other lens module.

Figure 5:
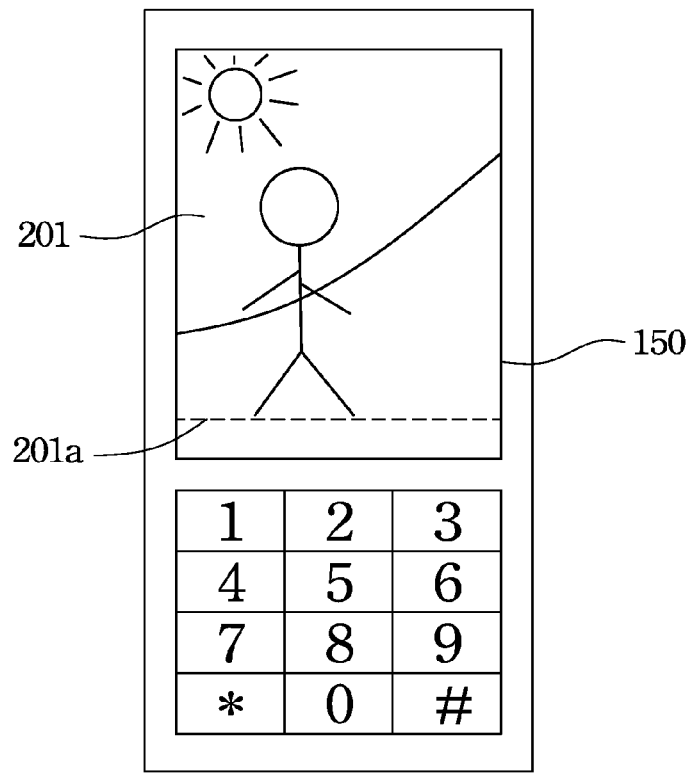
FIG. 5 illustrates an embodiment of the indication line displayed on the handheld electrical device 100 in FIG. 1.
Figure 6:
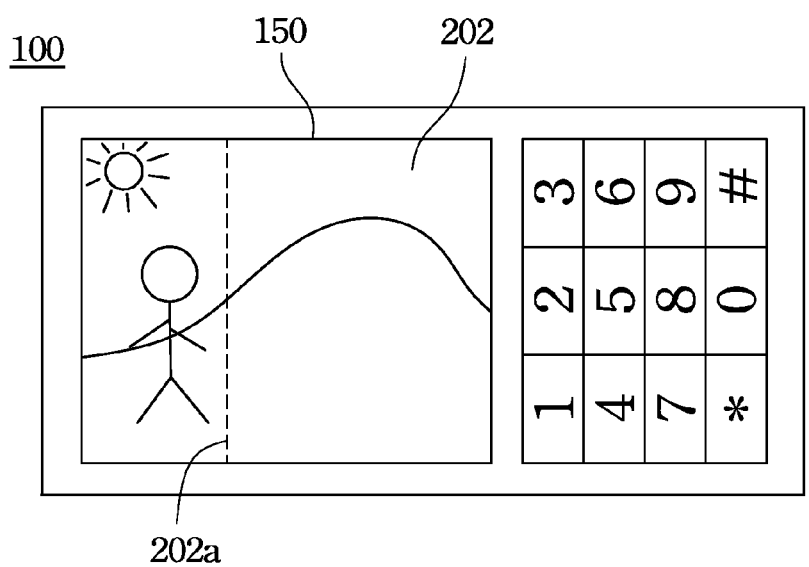
FIG. 6 illustrates another embodiment of the indication line displayed on the handheld electrical device 100 in FIG. 1.

FIG. 5 illustrates an embodiment of the indication line displayed on the handheld electrical device 100 in FIG. 1. FIG. 6 illustrates another embodiment of the indication line displayed on the handheld electrical device 100 in FIG. 1. For example, the first orientation of the handheld electrical device 100 may be a portrait orientation, and the second orientation of the handheld electrical device 100 may be a landscape orientation. Hence, when the handheld electrical device 100 is in the photograph mode and the orientation sensing module 160 senses that the handheld electrical device 100 is in the portrait orientation, the control unit 110 controls the display unit 150 to display the portrait image 201 captured by the first lens module 120 with the first image capturing boundary, and to further display a first indication line 201a (as shown in FIG. 5) on the displayed first image 201. Wherein the first indication line 201a indicate the position that the second image capturing boundary captured by the second lens module 130 corresponds to the first image capturing boundary. Besides, when the orientation sensing module 160 senses that the handheld electrical device 100 is in the landscape orientation, the control unit 110 controls the display unit 150 to display the landscape image 202 captured by the second lens module 130 with the second image capturing boundary, and to further display one second indication line 202a on the displayed scenes (as shown in FIG. 6) to indicate the first image capturing boundary captured by the first lens module 120. Therefore, when photographing portrait images, the corresponding landscape images can be indicated; when photographing landscape images, the corresponding portrait images can be indicated, which can assist users during photographing. In other embodiments, more indication lines can be further displayed, which should not be limited in this disclosure.

When the handheld electrical device 100 displays images captured by one of the lens modules, a miniature captured by the other lens module can be further displayed. Hence, when the handheld electrical device 100 is in the photograph mode and the orientation sensing module 160 senses that the handheld electrical device is in the first orientation, the control unit 110 controls the display unit 150 to further display a first miniature captured with the second image capturing boundary. When the handheld electrical device 100 is in the photograph mode and the orientation sensing module senses that the handheld electrical device 100 is in the second orientation, the control unit 110 controls the display unit 150 to further display a second miniature captured with the first image capturing boundary. Therefore, when the handheld electrical device 100 displays images captured by one of the lens modules, users can reach the miniature captured by the other lens module with the other image capturing boundary.

Figure 7:
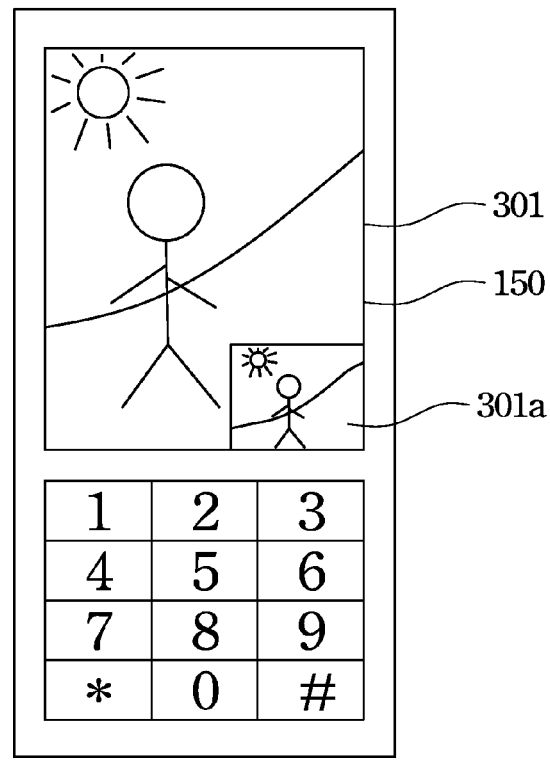
FIG. 7 illustrates an embodiment of the miniature displayed on the handheld electrical device 100 in FIG. 1.
Figure 8:
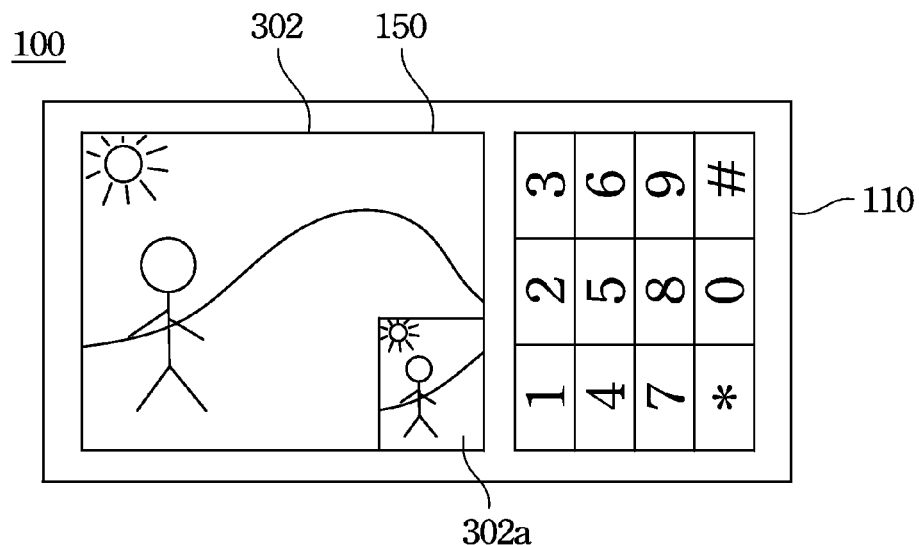
FIG. 8 illustrates another embodiment of the miniature displayed on the handheld electrical device 100 in FIG. 1.

FIG. 7 illustrates an embodiment of the miniature displayed on the handheld electrical device 100 in FIG. 1. FIG. 8 illustrates another embodiment of the miniature displayed on the handheld electrical device 100 in FIG. 1. For example, the first orientation of the handheld electrical device 100 may be a portrait orientation, and the second orientation of the handheld electrical device 100 may be a landscape orientation. Hence, when the handheld electrical device 100 is in the photograph mode and the orientation sensing module 160 senses that the handheld electrical device is in the portrait orientation, the control unit 110 controls the display unit 150 to display the portrait image 301 captured by the first lens module 120 with the first image capturing boundary, and to further display a first miniature 301a of the landscape image captured with the second image capturing boundary (as shown in FIG. 7). When the handheld electrical device 100 is in the photograph mode and the orientation sensing module 160 senses that the handheld electrical device is in the landscape orientation, the control unit 110 controls the display unit 150 to display the landscape image 302 captured by the second lens module 130 with the second image capturing boundary, and to further display a second miniature 302a of the portrait image captured with the first image capturing boundary (as shown in FIG. 8).

When the handheld electrical device 100 is in a browsing mode, the handheld electrical device 100 can display images corresponding to its orientation. Hence, when the handheld electrical device 100 is in a browsing mode and the orientation sensing module 160 senses that the handheld electrical device 100 is in the first orientation, the control unit 110 controls the display unit 150 to display the first image. When the handheld electrical device 100 is in the browsing mode and the orientation sensing module 160 senses that the handheld electrical device 100 is in the second orientation, the control unit 110 controls the display unit 150 to display the second image. Hence, when the handheld electrical device 100 is in the browsing mode, the handheld electrical device 100 can control its display unit 150 to display images captured with different image capturing boundaries corresponding to the orientation of the handheld electrical device 100. In other words, when the handheld electrical device 100 is in the browsing mode, the user can change the orientation of the handheld electrical device 100 to control the handheld electrical device 100 to display images captured with different image capturing boundaries for browsing, which is convenient to users for operation.

In addition, the handheld electrical device 100 can set the first image capturing boundary and the second image capturing boundary according to the interesting characteristics set by the user. Hence, the control unit 110 can receive an interesting characteristic through the input unit 140. The control unit 110 determines the first image capturing boundary and the second image capturing boundary automatically according to the interesting characteristic. Then, the first lens module 120 can capture the first image with the interesting characteristic according to the first image capturing boundary; the second lens module 130 can capture the second image with the interesting characteristic according to the second image capturing boundary. Wherein, the interesting characteristic may be a human facial feature, smiling feature etc. Therefore, the interesting characteristic, which interests user, can always captured in the image.

Figure 9:
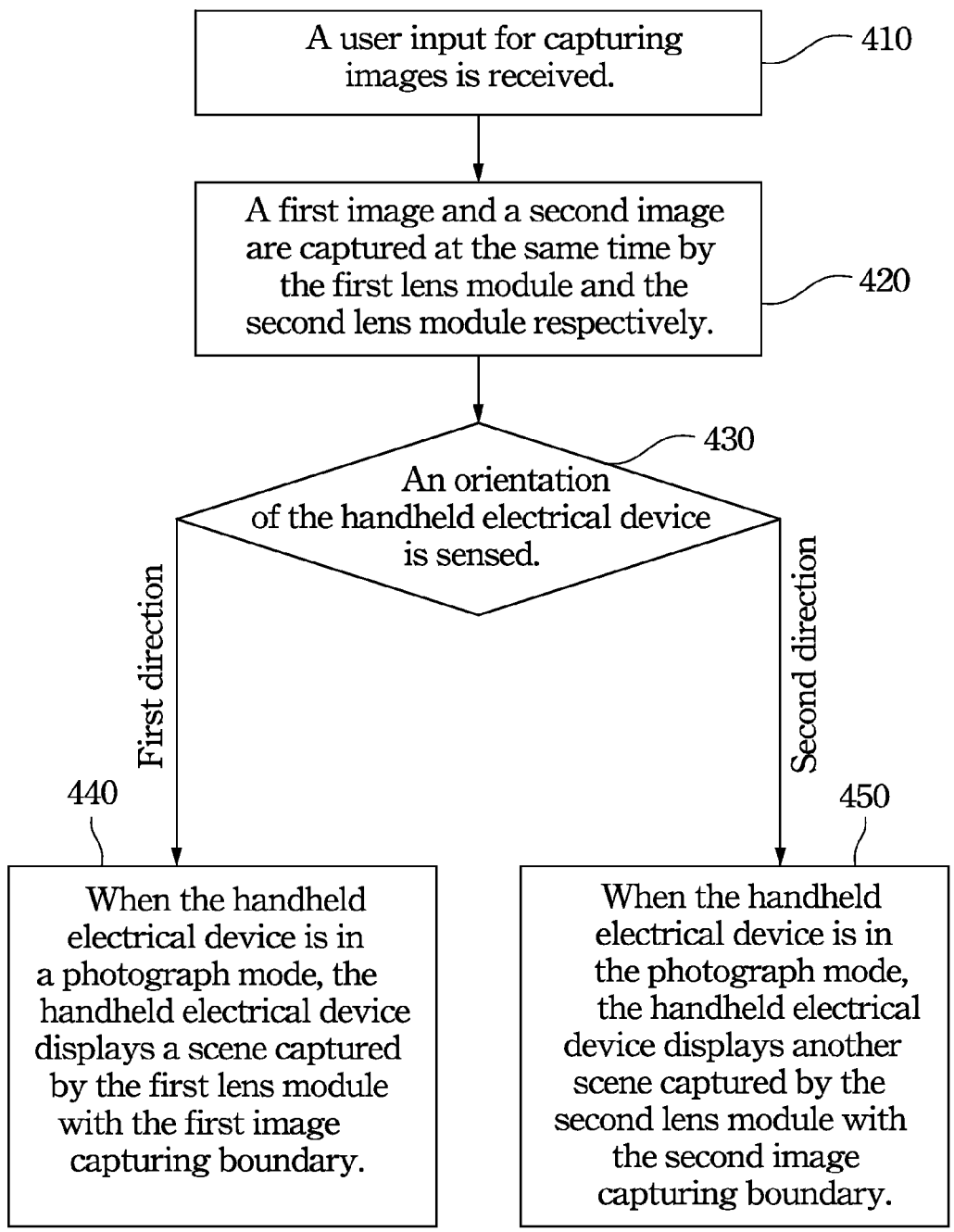
FIG. 9 is a flow diagram of a dual image capturing method according to one embodiment of this invention.

FIG. 9 is a flow diagram of a dual image capturing method according to one embodiment of this invention. In the dual image capturing method, when a user wants to utilize a handheld electrical device to capture images, the handheld electrical device controls different lens modules, image capturing boundaries of which are different, to capture images with the different image capturing boundaries at the same time. The dual image capturing method is suitable for a handheld electrical device. The handheld electrical device includes a first lens module with a first image capturing boundary and a second lens module with a second image capturing boundary. Wherein, the first image capturing boundary and the second image capturing boundary are different. The dual image capturing method can be implemented as a computer program product, which includes at least one program instruction. The at least one program instruction of the computer program product is used for being loaded into the handheld electrical device. After the at least one program instruction of the computer program product is loaded into the handheld electrical device, the handheld electrical device executes the steps of the dual image capturing method. The computer program product can be stored in a handheld-electrical-device readable storage medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The dual image capturing method 400 includes the following steps:

In step 410, a user input for capturing images is received.

In step 420, when the user input is received (step 410), a first image and a second image are captured at the same time by the first lens module and the second lens module respectively. Wherein, the first image is the one captured by the first lens module with the first image capturing boundary, and the second image is the one captured by the second lens module with the second image capturing boundary. The first image and the second image may include pictures, videos or other types of image. Therefore, the handheld electrical device can capture images with different image capturing boundaries at the same time without moving the handheld electrical device.

In one embodiment of step 420, the first image, which is captured by the first lens module with the first image capturing boundary, may be a portrait image (captured in a portrait mode), and the second image, which is captured by the second lens module with the second image capturing boundary, may be a landscape image (captured in a landscape mode). Therefore, a portrait image and a landscape image can be captured at the same time without moving the handheld electrical device. In addition, when the user selects a video mode of a traditional handheld electrical device, the user can only take a landscape video. If the user wants to view the landscape video on a portrait screen, the user has to wait a long time for image trans-coding. In other words, during the trans-coding, the original coded landscape video must be decoded before encoding to a portrait video. Since the image trans-coding takes a long time, the user can't view the landscape images immediately. Besides, since the landscape images are coded twice, the landscape images may be distorted, which may lead to worse image quality. If the present invention is applied, the user can switch between portrait images and landscape images without too much image distortion.

Besides, the handheld electrical device can display image captured by different lens modules with different image capturing boundaries corresponding to the orientation (such as portrait orientation or landscape orientation) of the handheld electrical device. Hence, in step 430, an orientation of the handheld electrical device may be sensed. Wherein, the orientation of the handheld electrical device may be sensed (step 430) utilizing a g sensor or any other element which can do orientation sensing.

In step 440, when the handheld electrical device is in a first orientation and the handheld electrical device is in a photograph mode, the handheld electrical device displays a scene captured by the first lens module with the first image capturing boundary.

In step 450, when the handheld electrical device is in a second orientation and the handheld electrical device is in a photograph mode, the handheld electrical device displays another scene captured by the second lens module with the second image capturing boundary. Wherein, the first orientation and the second orientation are different. Hence, when the handheld electrical device is in the photograph mode, the handheld electrical device can display scenes captured by different lens modules with different image capturing boundaries in real time corresponding to the orientation of the handheld electrical device. Besides, the first orientation of the handheld electrical device may be a portrait orientation, the second orientation of the handheld electrical device may be a landscape orientation, the first image corresponding to the first orientation (portrait orientation) is a portrait image, and the second image corresponding to the second orientation (landscape orientation) is a landscape image. Therefore, when the handheld electrical device is in the photograph mode, the user can put the handheld electrical device in the portrait or landscape orientation correspondingly for user's convenience. Besides, the portrait image being displayed horizontally or the landscape image being displayed vertically on the display unit of the handheld electrical device, which may waste the display area of the handheld electrical device, can be avoided.

When the handheld electrical device displays images captured by one of the lens modules, at least one indication line to indicate the boundary of the other lens module can be displayed on the displayed images. Hence, when the handheld electrical device is in the photograph mode and the handheld electrical device is in the first orientation, the handheld electrical device can further display one or more first indication lines on the displayed scenes on the displayed images in step 440. Wherein the one or more first indication lines indicate the position that the second image capturing boundary captured by the second lens module corresponds to the first image capturing boundary. Besides, when the handheld electrical device is in the photograph mode and the handheld electrical device is in the second orientation, the handheld electrical device further displays one or more second indication lines on the displayed images in step 450. Wherein the one or more second indication lines indicate the position that the first image capturing boundary captured by the first lens module corresponds to the second image capturing boundary. Therefore, when the handheld electrical device displays images captured by one of the lens modules, at least one indication line to indicate the corresponding boundary of the other lens module can be displayed on the displayed images, which can help users understand the boundary captured by the other lens module.

When the handheld electrical device displays images captured by one of the lens modules, a miniature captured by the other lens module can be further displayed. Hence, when the handheld electrical device is in the photograph mode and the handheld electrical device is in the first orientation, the handheld electrical device may further display a first miniature captured with the second image capturing boundary on the images displayed in step 440. When the handheld electrical device is in the photograph mode and the handheld electrical device is in the second orientation, the handheld electrical device may further display a second miniature captured with the first image capturing boundary on the images displayed in step 450. Therefore, when the handheld electrical device displays images captured by one of the lens modules, users can reach the miniature captured by the other lens module in the other image capturing boundary.

When the handheld electrical device is in a browsing mode, the handheld electrical device can display images corresponding to its orientation. Hence, when the handheld electrical device is in the first orientation and the handheld electrical device is in the browsing mode, the handheld electrical device displays the first image captured by the first lens module. Besides, when the handheld electrical device is in the second orientation and the handheld electrical device is in the browsing mode, the handheld electrical device displays the second image captured by the second lens module. Hence, when the handheld electrical device is in the browsing mode, the handheld electrical device can display images captured with different image capturing boundaries corresponding to the orientation of the handheld electrical device.

In addition, the handheld electrical device can set the first image capturing boundary and the second image capturing boundary, which are taken as the factor to execute step 420, according to the interesting characteristics set by the user. Hence, the dual image capturing method 400 may further includes the following steps: an interesting characteristic is received. The first image capturing boundary and the second image capturing boundary are determined automatically according to the interesting characteristic, such that the image with the interesting characteristic can be captured. Wherein, the interesting characteristic may be a human facial feature, smiling feature etc. Hence, in step 420, the first image and the second image are captured at the same time by the first lens module and the second lens module according to the first image capturing boundary and the second image capturing boundary respectively. Therefore, the interesting characteristic, which interests user, can always captured in the image.

Above all, the handheld electrical device can capture images with different image capturing boundaries at the same time without moving the handheld electrical device. Hence, when capturing images occurring in a flash, images in different image capturing boundaries can be captured to avoid missing any of the boundaries. Besides, if the images captured by the handheld electrical device are videos, the user can switch between portrait images and landscape images without too much image distortion.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A handheld electrical device comprising:
a first lens module with a first image capturing boundary, disposed on the handheld electrical device ;
a second lens module with a second image capturing boundary, disposed on the handheld electrical device, wherewith the first image capturing boundary and the second image capturing boundary are different;
an input unit, configured to receive a user input for capturing images;
a control unit, configured to control the first lens module and the second lens module to respectively capture a first image and a second image at the same time when the input unit receives the user input;
a display unit;
an orientation sensing module, configured to sense an orientation of the handheld electrical device; and
wherein when the handheld electrical device is in a photograph mode:
when the orientation sensing module senses that the handheld electrical device is in a first orientation, the control unit controls the display unit to display a scene captured by the first lens module with the first image capturing boundary;
when the orientation sensing module senses that the handheld electrical device is in a second orientation, the control unit controls the display unit to display another scene captured by the second lens module with the second image capturing boundary;
when the handheld electrical device is in the photograph mode and the orientation sensing module senses that the handheld electrical device is in the first orientation, the control unit controls the display unit to further display one or more first indication lines to indicate the second image capturing boundary; and
when the handheld electrical device is in the photograph mode and the orientation sensing module senses that the handheld electrical device is in the second orientation, the control unit controls the display unit to further display one or more second indication lines to indicate the first image capturing boundary.

2. The handheld electrical device of claim 1, wherein the first image is a portrait image, the second image is a landscape image, and the disposed orientation of the first lens module is substantially vertical to that of the second lens module.

3. The handheld electrical device of claim 1, wherein:
when the handheld electrical device is in the photograph mode and the orientation sensing module senses that the handheld electrical device is in the first orientation, the control unit controls the display unit to further display a first miniature captured by the second lens module with the second image capturing boundary; and
when the handheld electrical device is in the photograph mode and the orientation sensing module senses that the handheld electrical device is in the second orientation, the control unit controls the display unit to further display a second miniature captured by the first lens module with the first image capturing boundary.

4. The handheld electrical device of claim 1 further comprising:
when the handheld electrical device is in a browsing mode and a orientation sensing module of the handheld electrical device senses that the handheld electrical device is in a first orientation, the control unit controls a display unit of the handheld electrical device to display the first image; and when the handheld electrical device is in the browsing mode and the orientation sensing module senses that the handheld electrical device is in a second orientation, the control unit controls the display unit to display the second image.

5. The handheld electrical device of claim 1, wherein the first image and the second image include pictures and/or videos.

6. A dual image capturing method for a handheld electrical device, wherein the handheld electrical device comprises a first lens module with a first image capturing boundary and a second lens module with a second image capturing boundary, wherewith the first image capturing boundary is different from the second image capturing boundary, the method comprises:

receiving a user input for capturing images;

capturing a first image and a second image at the same time by the first lens module and the second lens module respectively when the user input is received;

sensing an orientation of the handheld electrical device; and when the handheld electrical device is in a photograph mode:

when handheld electrical device is in a first orientation, making the handheld electrical device display a scene captured by the first lens module with the first image capturing boundary;

when the handheld electrical device is in a second orientation, making the handheld electrical device display another scene captured by the second lens module with the second image capturing boundary;

when the handheld electrical device is in the photograph mode and the handheld electrical device is in the first orientation, further displaying one or more first indication lines to indicate the second image capturing boundary; and when the handheld electrical device is in the photograph mode and the handheld electrical device is in the second orientation, further displaying one or more second indication lines to indicate the first image capturing boundary.

7. The method of claim 6, wherein the first image is a portrait image, and the second image is a landscape image.

8. The method of claim 6 further comprising:

when the handheld electrical device is in the photograph mode and the handheld electrical device is in the first orientation, further displaying a first miniature captured by the second lens module with the second image capturing boundary; and when the handheld electrical device is in the photograph mode and the handheld electrical device is in the second orientation, further displaying a second miniature captured by the first lens module with the first image capturing boundary.

9. The method of claim 6 further comprising:

when the handheld electrical device is in a browsing mode and the handheld electrical device is in a first orientation, displaying the first image; and when the handheld electrical device is in the browsing mode and the handheld electrical device is in a second orientation, displaying the second image.

10. The method of claim 6, wherein the first image and the second image include pictures and/or videos.

11. A non-transitory computer program product comprising at least one program instruction for being loaded into a handheld electrical device, wherein the handheld electrical device comprises a first lens module with a first image capturing boundary and a second lens module with a second image capturing boundary, wherewith the first image capturing boundary is different from the second image capturing boundary, wherein the at least one program instruction executes at least following steps after loading into the handheld electrical device:

receiving a user input for capturing images;

capturing a first image and a second image at the same time by the first lens module and the second lens module respectively when the user input is received;

sensing an orientation of the handheld electrical device; and when the handheld electrical device is in a photograph mode:

when handheld electrical device is in a first orientation, making the handheld electrical device display a scene captured by the first lens module with the first image capturing boundary;

when the handheld electrical device is in a second orientation, making the handheld electrical device display another scene captured by the second lens module with the second image capturing boundary;

when the handheld electrical device is in the photograph mode and the handheld electrical device is in the first orientation, further displaying one or more first indication lines to indicate the second image capturing boundary; and when the handheld electrical device is in the photograph mode and the handheld electrical device is in the second orientation, further displaying one or more second indication lines to indicate the first image capturing boundary.

\* \* \* \* \*